(12) United States Patent
Suzuki et al.

(10) Patent No.: US 7,195,844 B2
(45) Date of Patent: Mar. 27, 2007

(54) LITHIUM SECONDARY BATTERY

(75) Inventors: Tadashi Suzuki, Tokyo (JP); Tsuyoshi Iijima, Tokyo (JP); Jun-ichi Satoh, Tokyo (JP); Satoshi Maruyama, Tokyo (JP)

(73) Assignee: TDK Corporation, Tokyo (JP)

( * ) Notice: Subject to any disclaimer, the term of this patent is extended or adjusted under 35 U.S.C. 154(b) by 218 days.

(21) Appl. No.: 10/400,538

(22) Filed: Mar. 28, 2003

(65) Prior Publication Data

US 2003/0215716 A1 Nov. 20, 2003

(30) Foreign Application Priority Data

Mar. 28, 2002 (JP) .............................. 2002-091676

(51) Int. Cl.
*H01M 4/62* (2006.01)
*H01M 4/58* (2006.01)

(52) U.S. Cl. .................. 429/232; 429/233; 429/234; 429/231.8; 429/231.1; 429/231.3; 429/217

(58) Field of Classification Search ............... 429/232, 429/234, 231.8, 217, 233, 231.1, 231.3; 29/623.3, 29/623.4
See application file for complete search history.

(56) References Cited

U.S. PATENT DOCUMENTS

| | | | |
|---|---|---|---|
| 4,576,883 A * | 3/1986 | Hope et al. ................. | 429/215 |
| 6,159,635 A | 12/2000 | Dasgupta et al. ............ | 429/216 |
| 6,406,814 B1 * | 6/2002 | Gorkovenko et al. ....... | 429/213 |
| 6,548,208 B1 * | 4/2003 | Kasamatsu et al. .... | 429/231.95 |
| 2002/0086206 A1 * | 7/2002 | Fauteux et al. .......... | 429/231.8 |
| 2003/0113627 A1 * | 6/2003 | Choi et al. .................. | 429/217 |

FOREIGN PATENT DOCUMENTS

| | | |
|---|---|---|
| CN | 1112733 | 11/1995 |
| JP | 03-017965 | 1/1991 |
| JP | 11-339782 | 12/1999 |

* cited by examiner

*Primary Examiner*—Laura Weiner
(74) *Attorney, Agent, or Firm*—Oblon, Spivak, McClelland, Maier & Neustadt, P.C.

(57) ABSTRACT

In a lithium secondary battery comprising positive and negative electrodes each comprising at least an active material capable of occluding and releasing lithium ions, a binder and a current collector, and an electrolytic solution, the active material in the positive and/or negative electrode has been made conductive by coating its surface with a conductive agent and a binder, and affixed to the surface of the collector by a dry process. The lithium secondary battery is given a higher energy density and a higher output density and will find a wider range of application.

11 Claims, 3 Drawing Sheets

LITHIUM SECONDARY BATTERY

TECHNICAL FIELD

This invention relates to a lithium secondary battery for use as a power supply.

BACKGROUND OF THE INVENTION

Lithium ion secondary batteries have been widely used as a power supply to portable and compact equipment because of their output capability. More than a decade has passed since lithium secondary batteries were put on the market, and efforts to improve their performance have been continued. A high capacitance and safety are important technical targets for lithium secondary batteries.

In the prior art, the electrode of the lithium ion secondary battery is prepared by dispersing an electrode active material, a binder and optionally, a conductive agent in a solvent to form a slurry, and coating the slurry to a current collector typically in the form of a metal foil. The conductive agent is optionally added to the electrode and generally selected from among graphite, carbon black, acetylene black, carbon fibers, and metals such as nickel, aluminum, copper and silver, with graphite, carbon black and acetylene black being preferred.

The positive electrode active material for lithium ion secondary batteries is generally a material capable of taking lithium ions into and out of its structure. Examples include lithium-containing metal oxides such as lithium cobaltate, lithium nickelate, and lithium manganate, and lithium-containing composite metal oxides in which at least one metal element such as aluminum, manganese, tin, iron, copper, magnesium, titanium, zinc or molybdenum is added to the foregoing metal oxides.

These metal oxides, however, are short of electronic conduction and need the addition of conductive agents in order to use metal oxides as electrodes in lithium ion secondary batteries.

The preferred conductive agents are carbon black and acetylene black which can form a good conduction network. When they are used as the conductive agent for the positive electrode, the electrode is prepared by dispersing the conductive agent in a binder solution together with an active material to form a coating solution, and applying the coating solution to a metal foil, typically aluminum foil as a current collector, followed by drying and rolling.

In the step of drying the coated electrode, carbon black or acetylene black and the binder come afloat near the surface of the coating because of their low specific gravity, as the solvent evaporates off. Such segregation interferes with good conduction paths created by intimate contact among the active material, conductive agent and binder and adversely affects the adhesion between the current collector and the active material. This influence becomes more outstanding as the electrode thickness increases. For this reason, in the prior art positive electrode, the amount of active material laden per positive electrode unit area must be limited to 20 $mg/cm^2$ or less. This becomes a bar against the desire to increase the energy density and output of lithium ion secondary batteries.

The prior art method for the preparation of electrodes by the wet process has the problem that the conductive agent and the binder can move apart from the collector foil during the drying step after the coating step, detracting from electrical conduction and adhesion to the collector. This phenomenon becomes outstanding particularly when an electrode active material having poor electronic conduction is used and a thick film electrode is to be formed. It is a serious barrier against acquiring satisfactory battery characteristics. Specifically, the phenomenon becomes outstanding when the positive electrode of a lithium ion secondary battery uses the above-mentioned positive electrode active material and the amount of active material laden per unit area is more than 20 $mg/cm^2$. If the amount of active material laden per unit area exceeds 30 $mg/cm^2$, the battery characteristics lower below the practically acceptable level.

This is also true, for example, when carbonaceous materials or titanium oxides capable of occluding and releasing lithium ions are used as the negative electrode active material and when vanadium oxides are used as the positive electrode active material. To solve the above problem, a better conduction path than in the prior art electrode must be created within the electrode material.

SUMMARY OF THE INVENTION

It is therefore an object of the present invention is to provide a lithium secondary battery capable of affording a higher energy density and a higher output density and finding a wider area of application.

According to one aspect of the invention, there is provided a lithium secondary battery comprising positive and negative electrodes each comprising at least an active material capable of occluding and releasing lithium ions, a binder and a current collector, and an electrolytic solution, wherein the active material in at least one of the positive and negative electrodes has been made conductive by coating its surface with a conductive agent and a binder, and affixed to the surface of the current collector by a dry process.

In a preferred embodiment, the active material that has been made conductive is formed into a sheet which is bonded to the current collector having a conductive adhesive layer thereon. More preferably, the conductive adhesive layer contains at least a conductive agent and a binder and has been formed on the collector by a coating process. Often the amount of the active material laden per unit area of the electrode is at least 20 $mg/cm^2$, and the active material is typically a carbonaceous material.

DESCRIPTION OF THE PREFERRED EMBODIMENTS

Figure 1:
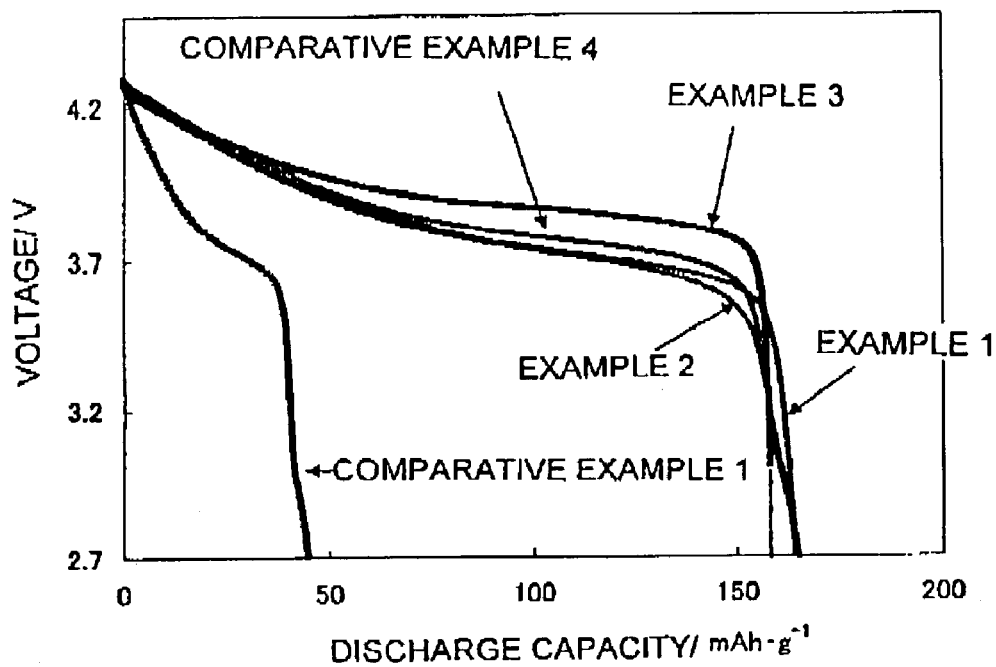
FIG. 1 is a graph showing discharge curves of Examples 1–3, Comparative Example 1 and Comparative Example 4 (standard).

The lithium secondary battery of the present invention includes positive and negative electrodes each comprising at least an active material capable of occluding and releasing lithium ions, a binder and a current collector, and an electrolytic solution. The active material in the positive and/or negative electrode has been made conductive by coating its surface with a conductive agent and a binder, and affixed to the surface of the current collector by a dry process.

The invention intends to increase the energy density and output density of a lithium secondary battery by creating an effective conduction network within the active material-containing layer in the electrode, increasing the amount of active material laden per unit area, and forming the electrode as a thick film. To this end, the electrode active material must be endowed with better conductivity than before. In this regard, a treatment to impart conductivity to the surface of a electrode active material is necessary. More specifically, a solution is made by carrying out composite treatment for the purpose of tightly binding a conductive agent and a binder to the surface of electrode active material. The electrode material thus obtained is processed into an electrode by a dry process whereby the desired battery having a high energy density and high output density is obtainable.

The processing by the dry process prevents the phenomenon in the prior art that the conductive agent and the binder move apart from the active material and the collector foil during the drying step of coated electrode to detract from electric conduction and the adhesion. This enables to increase the thickness of the active material-containing layer on the surface of the electrode or collector, thus enabling to endow the battery with a high energy density and high output density.

In the invention, an electrode active material must first be treated to be electrically conductive. To endow the active material with conductivity, a treatment of binding a conductive agent, a binder and the like to the surface of the active material is carried out prior to formation of an electrode. More specifically, a binder is dissolved in a suitable solvent to form a solution, a conductive agent is dispersed in the solution, and the solution is sprayed to an active material fluidized in a suitable container.

The solvent used herein is not critical as long as the conductive agent and binder are dispersible and dissolvable therein. For example, N-methyl-2-pyrrolidone, N,N-dimethylformamide, etc. may be used.

The active material should preferably have a BET specific surface area of about 0.1 to 2.0 $m^2/g$, more preferably about 0.1 to 1.5 $m^2/g$, an average particle size of about 1 to 20 μm, more preferably about 1 to 15 μm, and after the conductive treatment, an average particle size of about 50 to 500 μm, more preferably about 50 to 300 μm. It is noted that the particles as conductive-treated may take the form of composite particle aggregates containing a plurality of conductive-treated active materials.

The total amount of the conductive agent and binder applied to the active material is desirably about 3 to 15% by weight of the active material.

Through the spray treatment, the binding of the conductive agent and binder to the surface of the active material and drying are accomplished. The atmosphere for the spray treatment should preferably have a temperature of about 50 to 100° C.

The thus obtained conductive particles are then affixed to the surface of a current collector by a dry process. One typical dry process involves feeding the conductive particles alone or along with a current collector to a hot platen press or hot roll mill to shape into a sheet or electrode. In a process preferred in the invention, the active material as conductive-treated is shaped into a sheet using a hot roll mill, and the sheet is bonded to the surface of a current collector. Bonding of the sheet may be done using a binder, but preferably by a dry process as in the sheeting step. Specifically, the sheet may be thermally bonded to the surface of a current collector having a conductive adhesive layer thereon.

As to the sheeting conditions in a hot roll mill, it is preferred to heat near the melting point of the binder used so that the binder softens to exert binding effects. The upper limit of the heating temperature is desirably the melting point of the binder+20° C. because a temperature corresponding to the melting point of the binder+more than 20° C. can introduce a disturbance offsetting the binding effects due to softening of the binder. Specifically, the heating temperature is preferably 50 to 150° C., more preferably 70 to 150° C., even more preferably 70 to 120° C. The pressure of the hot roll mill is preferably adjusted to apply a linear pressure of about 100 to 1,200 kgf/cm, more preferably about 100 to 1,000 kgf/cm.

The active material sheet thus obtained preferably has a thickness of about 80 to 400 μm, more preferably about 80 to 300 μm.

The electrode sheet is bonded to a current collector, preferably having a conductive adhesive layer thereon. In this regard, the conductive adhesive layer should preferably be heat bondable so that a bond is formed by hot pressing. The conductive adhesive layer may have a composition comprising a conductive agent and a binder. The conductive adhesive layer may be formed by a coating technique.

The composition of the adhesive layer is preferably formulated to give a conductive agent:binder weight ratio of 10–30:70–90 for the positive electrode and a conductive agent:binder weight ratio of 20–40:60–80 for the negative electrode. The conductive agent and binder in the conductive adhesive layer may be the same as used in the active material-containing layer in sheet form, but may also be different therefrom. However, since conduction and heat bonding must be established therebetween, at least the binders used should preferably be of the same type. Also the contents of the conductive agent and binder may be the same as those in the active material-containing layer or different therefrom.

The adhesive layer is prepared by first dispersing a conductive agent in a binder solution to form a coating solution. The solvent for the binder solution is not critical as long as the conductive agent and binder are dispersible and dissolvable. Any of the solvents exemplified for the active material-containing layer may be used.

Then, the conductive adhesive layer-coating solution is coated to a current collector. The coating means is not critical and may be selected as appropriate in accordance with the material and shape of the current collector. In general, metal mask printing, electrostatic painting, dip coating, spray coating, roll coating, doctor blade, gravure coating and screen printing techniques are useful. Thereafter, rolling treatment is carried out using a platen press, calender roll or the like, if necessary.

Then the solvent is evaporated off, leaving the conductive adhesive layer-bearing current collector. The coating thickness is preferably about 2 to 10 μm.

The active material-containing sheet is bonded to the conductive adhesive layer-bearing current collector to complete an electrode. The sheet to be bonded may be a single sheet or more than one sheet.

The amount of active material laden per unit area on the resulting electrode is preferably at least 20 $mg/cm^2$, especially at least 25 $mg/cm^2$. The upper limit of the laden amount is not critical though it is usually about 300 $mg/cm^2$. It is noted that the laden amount is preferably at least 15 $mg/cm^2$ when the active material is a carbonaceous material.

The positive electrode active material capable of occluding and releasing lithium ions which is used herein may be any well-known material. The preferred positive electrode active materials include lithium-containing metal oxides such as lithium cobaltate ($LiCoO_2$), lithium nickelate ($LiNiO_2$) and lithium manganate ($LiMn_2O_4$), and lithium-containing composite metal oxides in which at least one metal element such as aluminum, manganese, tin, iron, copper, magnesium, titanium, zinc or molybdenum is added to the foregoing metal oxides.

More preferably, use may be made of composite oxide materials of the formula:

$$Li_xMn_yNi_zCo_{1-y-z}O_w$$

wherein x, y, z and w are in the range: $0.85 \leq x \leq 1.1$, $0 \leq y \leq 0.6$, $0 \leq z \leq 1$, and $1 \leq w \leq 2$.

The negative electrode active materials capable of occluding and releasing lithium ions which are used herein include carbon materials, metallic lithium, lithium alloys, and oxides.

Suitable carbon materials include, for example, synthetic graphite, natural graphite, meso-phase carbon microbeads (MCMB), meso-phase carbon fibers (MCF), coke, vitreous carbon, and fired organic polymers. Suitable lithium alloys include Li—Al, Li—Si, and Li—Sn. Suitable oxides include lithium titanate, $Nb_2O_3$ and $SnO$. They are generally used in powder form.

Of these, synthetic graphite having a lattice spacing of 0.335 to 0.380 nm between lattice faces (002) is preferred. It is noted that the lattice spacing between lattice faces (002) can be determined by x-ray diffractometry. Natural graphite contains impurities, which can degrade the quality of a graphite-bearing coating during the first charging step. Use of synthetic graphite avoids the influence of impurities and affords a coating having good ion permeability.

When the active material is used in powder form, it should preferably have an average particle size of 1 to 30 μm, especially 5 to 25 μm. Too small an average particle size tends to reduce the charge/discharge cycle life and increase the variance (or individual difference) of capacity. Too large an average particle size may exaggerate the variance of capacity, resulting in a lower average capacity. The reason why capacity varies over a range when the average particle size is large is presumably that the contact of negative electrode active material (typically graphite) with the current collector and the contact between active material particles become inconsistent.

Exemplary and preferred conductive agents are graphite, carbon black, acetylene black, carbon fibers, and metals such as nickel, aluminum, copper and silver. Inter alia, graphite, carbon black and acetylene black are preferred.

As the binder, use may be made of elastomers such as styrene-butadiene rubber (SBR) and resin materials such as polyvinylidene fluoride (PVdF). If necessary, an additive such as carboxymethyl cellulose (CMC) may be added.

The current collector used herein may be selected from conventional ones depending on the configuration of the device where the battery is used and the arrangement of the collector in a casing. In general, aluminum or the like is used for the positive electrode and copper, nickel or the like is used for the negative electrode. It is noted that a metal foil or metal mesh is generally used as the current collector. The metal mesh usually has a lower contact resistance with the electrode than the metal foil, but the contact resistance of the metal foil is acceptably low.

Figure 4:
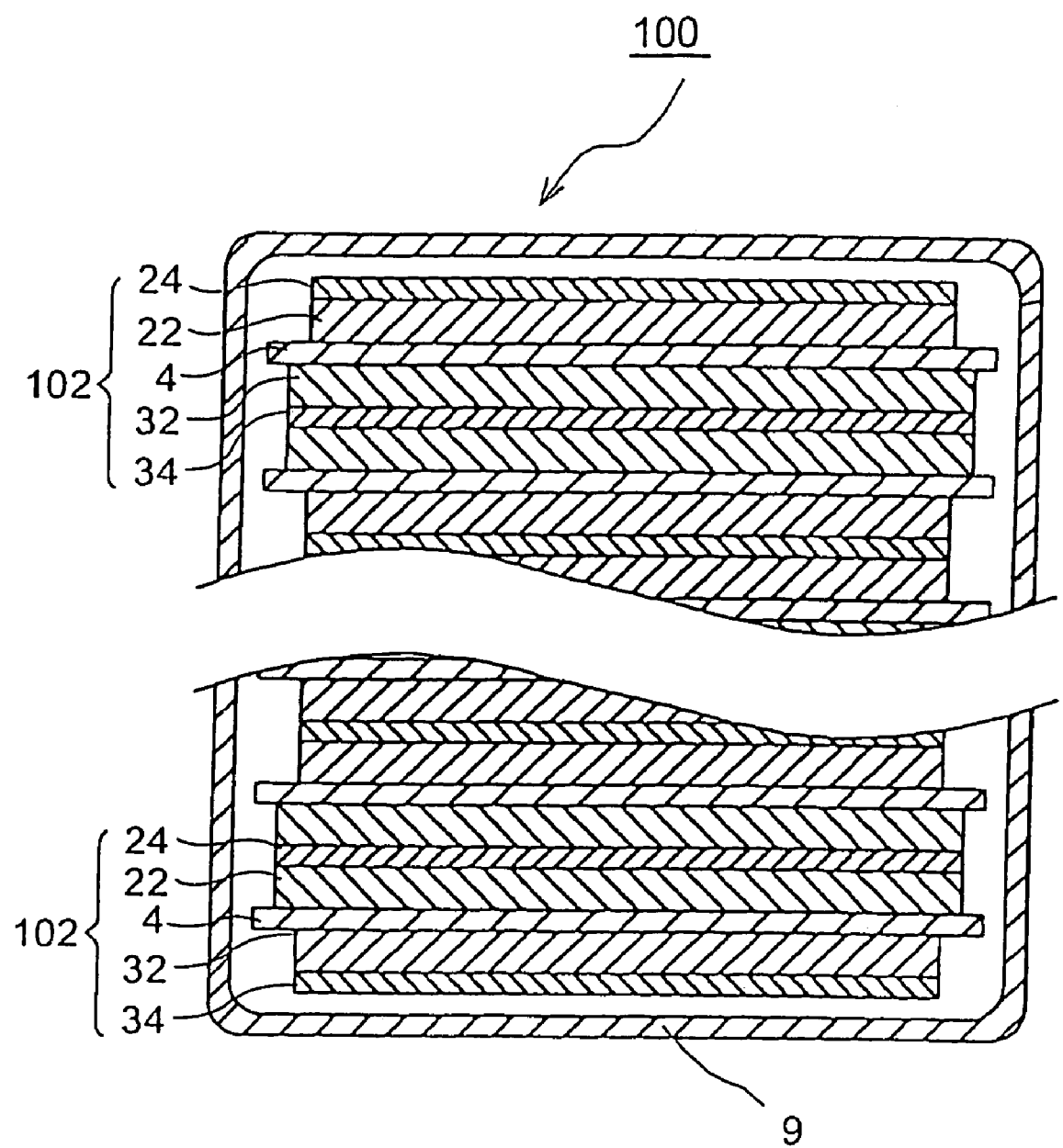
FIG. 4 is a schematic cross-sectional view showing the basic structure of a lithium secondary battery according to one embodiment of the invention.

Insofar as the active material-containing layer is formed using the composite particles as defined by the invention, the electrodes used herein are not critical with respect to their structure and the like. Insofar as the inventive electrode is used as at least one electrode of the anode and the cathode, the lithium secondary battery is not critical with respect to its construction and structure. For example, the battery may be constructed as a module 100 as shown in FIG. 4, by stacking a plurality of unit cells 102 each including an anode composed of a current collector member 24 and an active material-containing layer 22, a cathode composed of a current collector member 34 and an active material-containing layer 32, and an electrolyte layer 4 serving as a separator too and holding the stacked unit cells in a case 9 in a sealed state for packaging. It is noted that the anode and cathode may further include adhesive layers between the current collector members 24, 34 and the active material-containing layers 22, 32.

In the illustrated embodiment, the unit cells may be electrically connected either in parallel or in series. Also, a plurality of such modules 100 may be electrically connected either in parallel or in series to construct a battery unit. One exemplary battery unit is a serially connected battery unit constructed by electrically connecting a cathode terminal of one module 100 to an anode terminal of another module 100 through a metal piece.

Notably, when the above module 100 or battery unit is constructed, a protective circuit (not shown) or PTC (not shown) as used in the existing batteries may be incorporated, if necessary.

The structure of the lithium secondary battery is not critical although it is generally constructed from a positive electrode, a negative electrode, and a separator and as a laminate type or wound type battery. Such a positive electrode, a separator and a negative electrode are stacked in this order and pressed to form an electrode assembly.

In the practice of the invention, the lithium ion conductive material used may be a nonaqueous electrolytic solution having a lithium salt dissolved therein, or a gel-like polymer.

The solvent for the electrolytic solution is preferably one well compatible with solid polymer electrolytes and electrolyte salts. For use in lithium batteries, polar organic solvents which do not undergo decomposition even at high operating voltages are desirable. Examples include carbonates such as ethylene carbonate (EC), propylene carbonate (PC), butylene carbonate, dimethyl carbonate (DMC), diethyl carbonate (DEC), and ethyl methyl carbonate; cyclic ethers such as tetrahydrofuran (THF), 2-methyltetrahydrofuran, 1,3-dioxolane and 4-methyldioxolane; lactones such as γ-butyrolactone; sulfolanes such as 3-methylsulfolane, and dimethoxyethane, diethoxyethane, ethoxymethoxyethane and ethyl diglyme. Of these, ethylene carbonate (EC), propylene carbonate (PC), diethyl carbonate (DEC) and butylene carbonate are preferred, with EC being especially preferred.

Examples of the lithium ion-containing supporting salt include such salts as $LiClO_4$, $LiPF_6$, $LiBF_4$, $LiAsF_6$, $LiCF_3SO_2$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$ and $LiN(CF_3CF_2CO)_2$, and mixtures thereof. Of these, lithium hexafluorophosphate ($LiPF_6$) is especially preferred.

In the electrolytic solution, the concentration of the lithium salt is preferably 1 to 3 mol/liter, more preferably 1.0 to 2.5 mol/liter. If the concentration of the lithium salt is above the range, the electrolytic solution has so high a viscosity that high-rate discharge capacity and low-temperature discharge capacity lower. If the concentration of the lithium salt is below the range, the supply of lithium ions becomes short, also inviting a lowering of high-rate discharge capacity and low-temperature discharge capacity.

The gel-like polymers include, for example, polyacrylonitrile, polyethylene glycol, polyvinylidene fluoride (PVdF) and other polymers which have been swollen with the non-aqueous electrolytic solution having a lithium salt dissolved therein. If it is necessary to prevent short-circuiting between positive and negative electrodes, a porous film of polymer, for example, monoaxially or biaxially oriented film of polyolefin or non-woven fabric of polyolefin may be used as the separator or the substrate for lithium ion conductive polymer.

Preferably, the gel-like polymer forms a film of 5 to 100 µm thick, more preferably 5 to 60 µm thick, most preferably 10 to 40 µm thick.

Other separator-forming materials which can be used as a substitute for the gel-like polymer include one or more polyolefins such as polyethylene and polypropylene (when more than one is used, a laminate of two or more layers of film is contemplated), polyesters such as polyethylene terephthalate, thermoplastic fluoro-resins such as ethylenetetrafluoroethylene copolymers, and celluloses. When the polymer is in sheet form, a microporous film, woven fabric or non-woven fabric having an air permeability of about 5 to 2,000 sec/100 cc as measured according to JIS P8117 and a gage of about 5 to 100 µm may be used.

The casing is typically a laminate film including a metal foil, typically aluminum foil on opposite surfaces of which a thermal adhesive resin layer such as a polyolefin resin layer (e.g., polypropylene and polyethylene) and a heat resistant polyester resin layer are respectively laid. The casing is prepared by heat sealing a pair of laminate films along their three sides such that the thermal adhesive resin layers are bonded together to form a first seal, thus forming a bag having one open side. Alternatively, a bag is formed by folding a single laminate film and heat sealing the opposite sides.

The preferred laminate film is a laminate film of a multilayer structure including thermal adhesive resin layer/polyester resin layer/metal foil/polyester resin layer stacked in order from inside to outside, because this structure insures insulation between the metal foil of the laminate film and lead-out terminals. The use of such a laminate film is advantageous in the sense that the high-melting polyester resin layer is left non-melted at the end of heat sealing, so that the spacing between the metal foil of the laminate film and lead-out terminals is maintained, insuring insulation therebetween. From these considerations, the polyester resin layer in the laminate film should preferably have a thickness of about 5 to 100 µm.

Although the present invention relates to a lithium ion battery using an electrolytic solution, it is not limited thereto and is applicable to the use of solid electrolytes. Also the casing is not limited to the above-illustrated laminate type, and the cell units may be contained in a metal case as shaped by deep drawing.

EXAMPLE

Examples of the invention are given below by way of illustration and not by way of limitation.

Example 1

Preparation or Composite Particles for Positive Electrode

The positive electrode composite particles were prepared using a composite metal oxide of the formula:

$Li_xMn_yNi_zCo_{1-y-z}O_w$ wherein x=1, y=0.33, z=0.33 and w=2 as a positive electrode active material in an amount of 90% by weight, acetylene black as a conductive agent in an amount of 6% by weight, and polyvinylidene fluoride as a binder in an amount of 4% by weight. To impart conductivity to the composite metal oxide, a treatment was carried out on the composite metal oxide to bind acetylene black and polyvinylidene fluoride to the surface thereof prior to formation of an electrode.

More specifically, acetylene black was dispersed in a N,N-dimethylformamide (DMF) solution having polyvinylidene fluoride dissolved therein. The solution (containing 3% by weight acetylene black and 2% by weight polyvinylidene fluoride) was sprayed to the composite metal oxide powder in the form of a fluidized layer in a vessel whereby the ingredients were bound to the particles. The composite metal oxide powder used had a BET specific surface area of 0.55 m²/g and an average particle size of 12 µm. After the compositing treatment of particles, the composite particle aggregates had an average size of about 150 µm, which were used for electrode formation.

Preparation of Positive Electrode

The positive electrode composite particles prepared above were fed to a hot roll mill where an electrode sheet was formed. The hot roll mill was operated at a temperature of 130° C. and a linear pressure of 300 kgf/cm. The resulting electrode sheet had an active material laden amount of 60 mg/cm² and a porosity of 25%. The electrode sheet was bonded to an aluminum foil having a thermal adhesive conductive layer by means of a hot press at 200° C. and 50 MPa, yielding an electrode. The thermal adhesive conductive layer bad been formed by coating a slurry of 80% by weight polyvinylidene fluoride and 20% by weight acetylene black to the aluminum foil to a thickness of 5 µm.

Example 2

Conductive treatment and electrode preparation were carried out as in Example 1 except that the amount of positive electrode active material laden was 100 mg/cm².

Example 3

Conductive treatment and electrode preparation were carried out as in Example 1 except that $LiCoO_2$ was used as the positive electrode active material and the amount of active material laden was 60 mg/cm².

Example 4

Preparation of Composite Particles for Negative Electrode

The negative electrode composite particles were prepared using synthetic graphite as a negative electrode active material in an amount of 85% by weight, acetylene black as a conductive agent in an amount of 5% by weight, and polyvinylidene fluoride as a binder in an amount of 10% by weight. To impart conductivity to the synthetic graphite, a treatment was carried out on the graphite to bind acetylene black and polyvinylidene fluoride to the surface thereof prior to formation of an electrode.

More specifically, acetylene black was dispersed in a N,N-dimethylformamide (DMF) solution having polyvinylidene fluoride dissolved therein. The solution (containing 2% by weight acetylene black and 4% by weight polyvinylidene fluoride) was sprayed to the synthetic graphite powder in the form of a fluidized layer in a vessel whereby the ingredients were bound to the particles. The graphite powder used had a BET specific surface area of 1.0 m²/g and an average particle size of 30 µm. After the compositing treatment of particles, the composite particle aggregates had an average size of about 300 μm, which were used for electrode formation.

Preparation of Negative Electrode

The negative electrode composite particles prepared above were fed to a hot roll mill where an electrode sheet was formed. The hot roll mill was operated at a temperature of 110° C. and a linear pressure of 100 kgf/cm. The resulting electrode sheet had a negative material laden amount of 32 mg/cm$^2$ and a porosity of 25%. The electrode sheet was bonded to a copper foil having a thermal adhesive conductive layer by means of a hot press at 100° C. and 10 MPa, yielding an electrode. The thermal adhesive conductive layer had been formed by coating a slurry of 70% by weight methyl methacrylate and 30% by weight acetylene black to the copper foil to a thickness of 5 μm.

Comparative Example 1

The active material, conductive agent and binder used in Example 1 were mixed in the same composition as in Example 1, and the mixture shaped into an electrode by a conventional coating process. More specifically, using a planetary mill and homogenizer, the active material, conductive agent and binder were mixed and dispersed to form a slurry. The slurry was coated to an aluminum foil having a thermal adhesive conductive layer, yielding a positive electrode having the same active material laden amount and porosity as in Example 1. The thermal adhesive conductive layer was the same as in Example 1.

Comparative Example 2

The active material, conductive agent and binder used in Example 4 were mixed in the same composition as in Example 4, and the mixture shaped into an electrode by a conventional coating process. More specifically, using a planetary mill and homogenizer, the active material, conductive agent and binder were mixed and dispersed to form a slurry. The slurry was coated to an aluminum foil having a thermal adhesive conductive layer, yielding a negative electrode having an active material laden amount of 20 mg/cm$^2$ and a porosity of 38%. The thermal adhesive conductive layer was the same as in Example 4.

The electrodes were evaluated by using metallic lithium as a counter electrode and examining the reaction of lithium ions with the electrode. Commonly used electrodes were contemplated as the electrodes in Comparative Example 4. Both positive and negative electrodes were prepared using the material and coating process in Comparative Examples 1 and 2 and compared with Examples and Comparative Examples. In Comparative Example 4, the positive electrode had an active material laden amount of 15 mg/cm$^2$ and a porosity of 30%, and the negative electrode had an active material laden amount of 8 mg/cm$^2$ and a porosity of 35%. Evaluation was made with the current density set to 1.6 mA/cm$^2$ on the positive electrode (electrode of Comparative Example 4: 0.2 mA/cm$^2$) and to 1.7 mA/cm$^2$ on the negative electrode (electrode of Comparative Example 4: 0.2 mA/cm$^2$).

Table 1 shows the discharge capacity of the positive electrode and Table 2 shows the discharge capacity of the negative electrode.

TABLE 1

| Sample | Amount of active material laden (mg/cm$^2$) | Discharge capacity (mAh/g) | Discharge current density (mA/cm$^2$) |
|---|---|---|---|
| Example 1 | 50 | 165 | 1.6 |
| Example 2 | 100 | 165 | 3.2 |
| Example 3 | 50 | 156 | 1.6 |
| Comparative Example 1 | 50 | 22 | 1.6 |
| Comparative Example 4 | 18 | 164 | 0.2 |

TABLE 2

| Sample | Amount of active material laden (mg/cm$^2$) | Discharge capacity (mAh/g) | Discharge current density (mA/cm$^2$) |
|---|---|---|---|
| Example 4 | 32 | 329 | 1.7 |
| Comparative Example 2 | 20 | 266 | 1.7 |
| Comparative Example 4 | 8 | 309 | 0.2 |

FIG. 1 shows discharge curves of Examples 1 to 3, Comparative Example 1 and Comparative Example 4 (standard). As seen from FIG. 1, higher outputs are available from the electrodes comprising composite particles in Examples 1 to 3. The overpotential is not increased even when the current density is increased, presumably because an effective conduction network is established within the electrode by the compositing treatment of particles.

Figure 2:
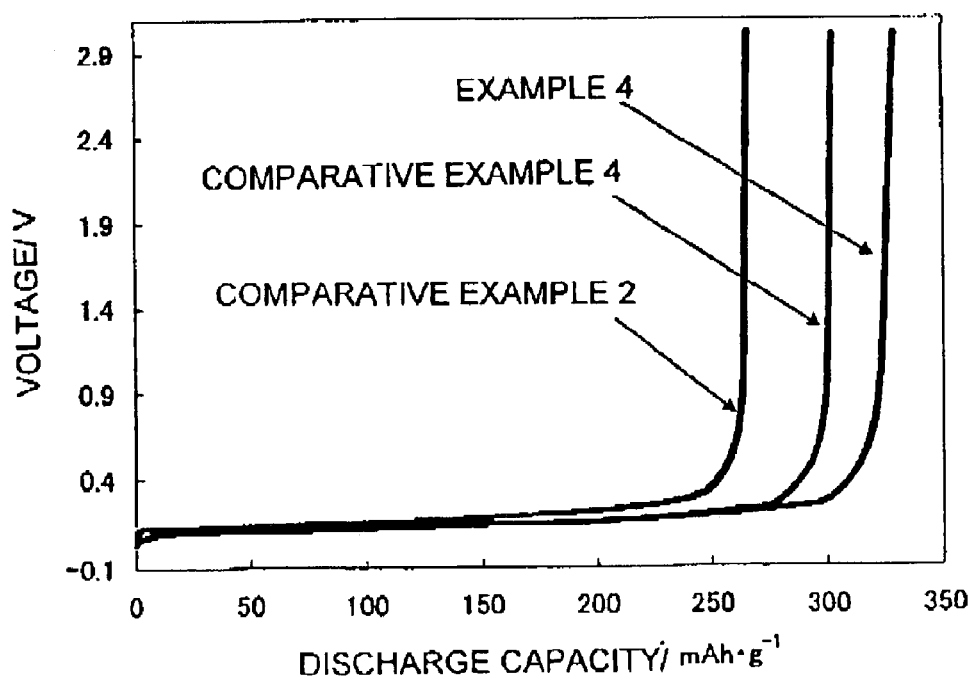
FIG. 2 is a graph showing discharge curves of Example 4, Comparative Example 2 and Comparative Example 4 (standard).

FIG. 2 shows discharge curves of Example 4, Comparative Example 2 and Comparative Example 4 (standard). As seen from FIG. 2, higher outputs are available from the electrodes comprising composite particles in Example 2. The overpotential is not increased even when the current density is increased, presumably because an effective conduction network is established within the electrode by the compositing treatment of particles.

Example 5

A battery was fabricated using the electrodes prepared in Examples 1 and 4. The battery was fabricated by stacking the positive and negative electrodes with a separator interposed therebetween, to form unit cells, placing them in an aluminum laminate film case and introducing an electrolytic solution therein. The electrolytic solution used was a nonaqueous electrolytic solution containing 1 mol/liter of LiPF$_6$ in a solvent mixture of EC/DEC in a volume ratio of 3/7. The battery had a thickness of 3.9 mm.

Comparative Example 3

A battery was fabricated as in Example 5 except that the positive electrode of Comparative Example 4 and the negative electrode of Comparative Example 4 were used. The battery had a thickness of 3.8 mm.

Figure 3:
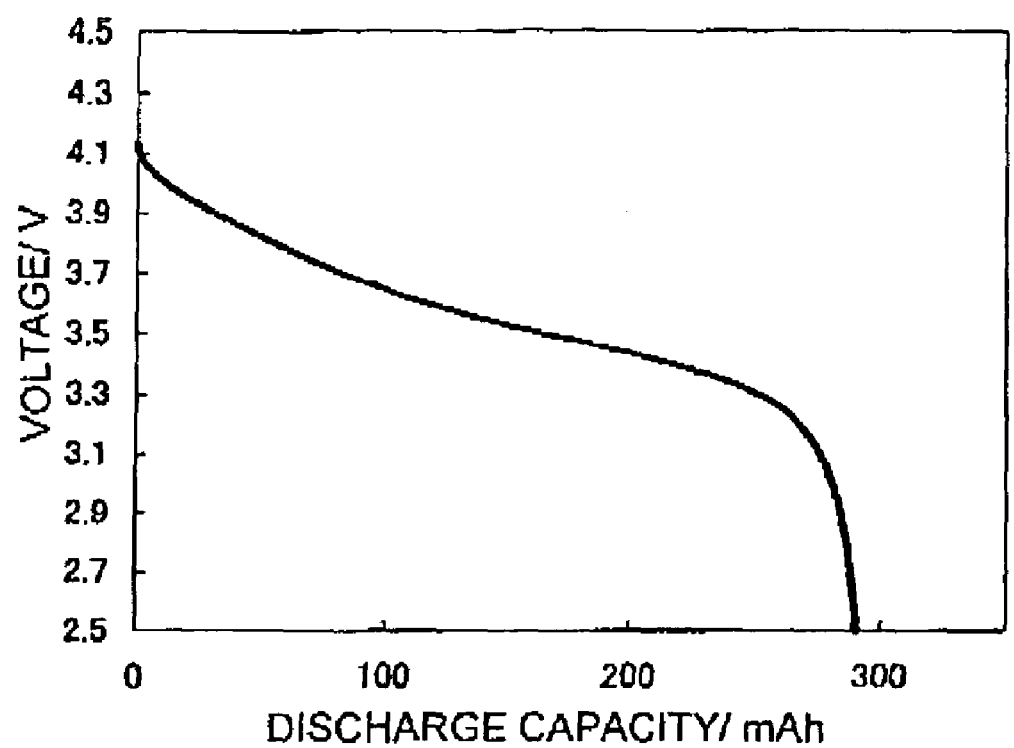
FIG. 3 is a graph showing a discharge curve of the battery of Example 5.

The discharge characteristics of these batteries are shown in Table 3. The discharge curve of the battery of Example 5 is shown in FIG. 3.

TABLE 3

| Sample | Discharge capacity (mAh/g) | Volume energy density (Wh/L) | Retention from 1st to 10th cycle (mg/cm$^2$) |
|---|---|---|---|
| Example 5 | 291 | 303 | 99.9 |
| Comparative Example 3 | 192 | 223 | 99.9 |

As seen from Table 3, a battery can be endowed with a high energy density, using an electrode in which an effective conduction network is formed. An attempt was made to construct a battery using the electrode of the same construction as Comparative Examples 1 and 2, but failed because of poor adhesion between the electrode layer and the current collector.

Japanese Patent Application No. 2002-091676 is incorporated herein by reference.

What is claimed is:

1. A lithium secondary battery comprising (1) positive and negative electrodes each comprising at least an active material capable of occluding and releasing lithium ions, a binder, and a current collector, (2) a conductive adhesive layer for at least one of said positive and negative electrodes, and (3) an electrolytic solution, wherein
the active material in at least one of said positive and negative electrodes has been made conductive by coating its surface with a conductive agent and the binder, and which coated active material is then formed into a sheet, which sheet is then affixed to the surface of the conductive adhesive layer for said electrode by a dry process,
wherein the sheet is bonded to said conductive adhesive layer, resulting in said conductive adhesive layer being located between the sheet and the current collector, and
wherein the negative electrode active material is synthetic graphite having a lattice spacing of 0.335 to 0.380 nm between lattice faces (002).

2. The lithium secondary battery of claim 1 wherein the conductive adhesive layer contains at least the conductive agent and the binder and has been formed on the collector by a coating process.

3. The lithium secondary battery of claim 1 wherein an amount of the active material laden per unit area of the electrode is at least 20 mg/cm$^2$.

4. The lithium secondary battery of claim 1 wherein the active material in one of said positive and negative electrodes is a carbonaceous material, and an amount of the active material laden per unit area of the electrode is at least 15 mg/cm$^2$.

5. The lithium secondary battery of claim 1 wherein the conductive agent is selected from the group consisting of graphite, carbon black and acetylene black.

6. The lithium secondary battery of claim 1 wherein the binder is selected from the group consisting of styrene-butadiene rubber and polyvinylidene fluoride.

7. The lithium secondary battery of claim 1 wherein the active material in at least one of said positive and negative electrodes has been made conductive by spray coating its surface with the conductive agent and the binder.

8. The lithium secondary battery of claim 1 wherein the conductive adhesive layer is formulated to provide a conductive agent:binder weight ratio of 10–30:70–90 for the positive electrode and 20–40:60–80 for the negative electrode.

9. A lithium secondary battery comprising (1) positive and negative electrodes each comprising at least an active material capable of occluding and releasing lithium ions, a binder, and a current collector, (2) a conductive adhesive layer for at least one of said positive and negative electrodes, and (3) an electrolytic solution, wherein
the active material in at least one of said positive and negative electrodes has been made conductive by coating its surface with a conductive agent and the binder, and which coated active material is then formed into a sheet, which sheet is then affixed to the surface of the conductive adhesive layer for said electrode by a dry process,
wherein the sheet is bonded to said conductive adhesive layer, resulting in said conductive adhesive layer being located between the sheet and the current collector, and
wherein the positive electrode active material has the formula:

$$Li_xMn_yCo_{1-y-z}O_w$$

wherein x, y, z and w are in the range: $0.85 \leq x \leq 1.1$, $0 \leq y \leq 0.6$, $0 \leq z \leq 1$, and $1 \leq w \leq 2$.

10. The lithium secondary battery of claim 9 wherein the negative electrode active material is synthetic graphite having a lattice spacing of 0.335 to 0.380 nm between lattice faces (002).

11. The lithium secondary battery of claim 9 wherein the conductive adhesive layer is formulated to provide a conductive agent:binder weight ratio of 10–30:70–90 for the positive electrode and 20–40:60–80 for the negative electrode.

* * * * *